(12) United States Patent
in't Zandt et al.

(10) Patent No.: US 9,171,810 B2
(45) Date of Patent: Oct. 27, 2015

(54) ELECTRONIC DEVICE INCORPORATING A RANDOMIZED INTERCONNECTION LAYER HAVING A RANDOMIZED CONDUCTION PATTERN

(71) Applicant: NXP B.V., Eindhoven (NL)

(72) Inventors: Michael Antoine Armand in't Zandt, Veldhoven (NL); Viet Hoang Nguyen, Leuven (BE)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 14/086,601

(22) Filed: Nov. 21, 2013

(65) Prior Publication Data

US 2015/0137380 A1 May 21, 2015

(51) Int. Cl.
*H01L 23/00* (2006.01)
*H01L 23/535* (2006.01)
*H01L 21/768* (2006.01)
*G06F 21/55* (2013.01)
*H04L 9/32* (2006.01)

(52) U.S. Cl.
CPC .............. *H01L 23/564* (2013.01); *G06F 21/55* (2013.01); *H01L 21/76838* (2013.01); *H01L 23/535* (2013.01); *H01L 23/57* (2013.01); *H01L 23/576* (2013.01); *H04L 9/3278* (2013.01)

(58) Field of Classification Search
CPC ................ H01L 23/564; H01L 23/535; H01L 21/76838; H01L 23/57; H01L 23/576; H01L 23/00; H01L 21/768; H04L 9/3278; G06F 21/55

USPC ...................... 257/773, 774, 43, 88, E29.068, 257/E21.204; 438/618
See application file for complete search history.

(56) References Cited

U.S. PATENT DOCUMENTS

| | | | | |
|---|---|---|---|---|
| 4,235,657 | A * | 11/1980 | Greenman et al. ............ | 156/234 |
| 5,117,457 | A | 5/1992 | Comerford et al. | |
| 5,201,681 | A * | 4/1993 | Okunuki et al. ................ | 445/24 |
| 5,432,047 | A * | 7/1995 | Cheng et al. ................... | 430/321 |
| 2002/0024453 | A1 | 2/2002 | Maeda | |
| 2005/0275001 | A1 | 12/2005 | Heessels | |
| 2006/0038182 | A1* | 2/2006 | Rogers et al. .................... | 257/77 |
| 2008/0157314 | A1 | 7/2008 | Clevenger et al. | |
| 2009/0233236 | A1* | 9/2009 | Black et al. .................... | 430/311 |
| 2010/0006836 | A1* | 1/2010 | Koukitu et al. ................. | 257/43 |
| 2011/0220814 | A1* | 9/2011 | Rudenja et al. ............ | 250/493.1 |

(Continued)

FOREIGN PATENT DOCUMENTS

| | | | |
|---|---|---|---|
| EP | 2665094 | A1 | 11/2013 |
| WO | 9818102 | A1 | 4/1998 |
| WO | 2008/140254 | A1 * | 11/2008 |

(Continued)

*Primary Examiner* — Alexander Oscar Williams (57) ABSTRACT

An electronic device incorporating a randomized interconnection layer. In one example, the device includes a randomized interconnection layer having a randomized conductive pattern formed by etching of a heterogeneous layer; and a sensing circuit, electrically coupled to the randomized interconnection layer to detect the randomized conductive pattern. In another example, a method of fabricating the device includes forming a set of electrodes proximate to a silicon substrate; depositing a heterogeneous layer of elements onto the substrate; etching the heterogeneous layer to form a randomized conductive pattern; and electrically coupling the electrodes to a sensing circuit and the randomized conductive pattern.

20 Claims, 6 Drawing Sheets

(56) References Cited

U.S. PATENT DOCUMENTS

2013/0214252 A1* 8/2013 Park et al. .................. 257/29
2014/0138613 A1* 5/2014 Kim et al. .................. 257/13

FOREIGN PATENT DOCUMENTS

| WO | 2009016589 A2 | 2/2009 |
| WO | 2010/105993 A2 | 9/2010 |

* cited by examiner

ELECTRONIC DEVICE INCORPORATING A RANDOMIZED INTERCONNECTION LAYER HAVING A RANDOMIZED CONDUCTION PATTERN

BACKGROUND

Brief Background Introduction

This specification relates generally to systems and methods for hardware-based customization and in one example to a security feature in an electronic device. Further improvements to such systems, methods, and devices are desired.

SUMMARY

An electronic device incorporating a randomized interconnection layer. In one example, the device includes a randomized interconnection layer having a randomized conductive pattern formed by etching of a heterogeneous layer; and a sensing circuit, electrically coupled to the randomized interconnection layer to detect the randomized conductive pattern. In another example, a method of fabricating the device includes forming a set of electrodes proximate to a silicon substrate; depositing a heterogeneous layer of elements onto the substrate; etching the heterogeneous layer to form a randomized conductive pattern; and electrically coupling the electrodes to a sensing circuit and the randomized conductive pattern.

The above summaries of the present disclosure are not intended to represent each disclosed embodiment, or every aspect, of the present invention. Other aspects and example embodiments are provided in the Figures and the detailed description that follow.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

DETAILED DESCRIPTION

Electronic device security is a key differentiator in certain applications, such as products having higher value or security requirements, such as bank notes or passports. While a security feature can be implemented in software, hardware-based security features in general are more difficult to bypass.

Hardware based security keys are often used in encryption algorithms to protect data transmissions between and within Integrated circuits (ICs). Such security keys should not easily be read-out or transferred into another, similar devices. They should be reliable, not easily influenced by a surrounding environment, and should be random and unique from IC to IC.

In one example, hardware-based security device is a nano-scale structurally disordered physical system, such as a PUF (Physical Unclonable Function). The device receives a challenge from external stimuli, and generates a response dependent upon the structural disorder designed into the device. When well designed, the device's structural disorder cannot be cloned or reproduced exactly, not even by its original manufacturer, and is unique to each device.

Cost is also an issue when fabricating hardware-based security device. Some devices are made using large, complex and costly circuits, however, techniques using standard IC manufacturing processes can reduce fabrication costs.

Figure 1:
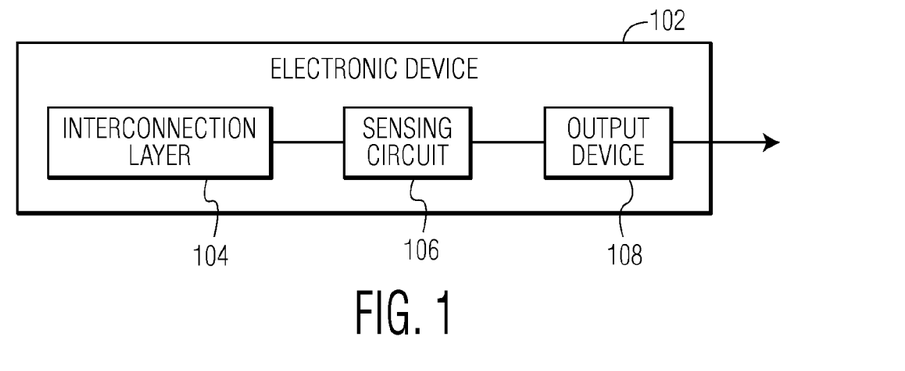
FIG. 1 is an electronic device incorporating a randomized interconnection layer.

FIG. 1 is an electronic device 102 incorporating a randomized interconnection layer 104. The electronic device 102 can function as a security device in many systems, devices and circuits requiring security, such as smartcards, secure communications, secure banking, and information security.

In one example, security is provided by the randomized interconnection layer 104 having a level of structural disorder. Structural disorder in the randomized interconnection layer 104 is akin to a unique finger print used by the electronic device 102 to provide various security features such as creating a PUF. In various embodiments, the randomized interconnection layer 104 is a randomly etched conductive layer, a randomly etched metal layer, a randomly etched resistive layer, and a randomly etched semiconductor layer. Variability in these layers can form discontinuities, voids, randomly distributed features of different shapes and sizes, alterations in the material properties of portions of the interconnection layer 104, or a combination of all of these variabilities. Fabrication of the randomized interconnection layer 104 is discussed extensively in the paragraphs which follow.

A sensing circuit 106 translates the structural disorder in the interconnection layer 104 into a unique signal, number, code, or other information format. Specific techniques for translating this structural disorder are discussed below. An output device 108 device performs further processing on the output from the sensing circuit 106. Processing performed by the output device 108 is tailored to the use of the electronic device 102. In one example, the output device 108 generates a security key, in another example the output device 108 generates a random number. Other outputs are possible.

Figure 2A:
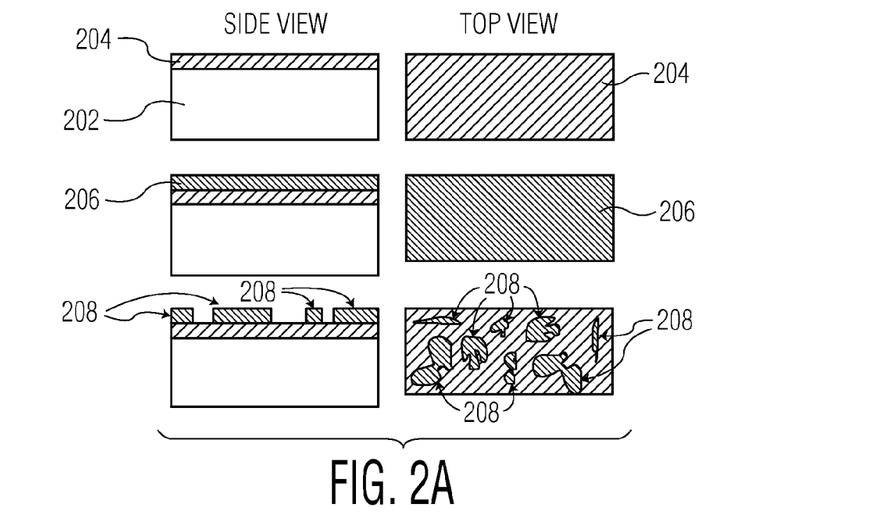
FIG. 2A is one example of a process for fabricating the randomized interconnection layer.

FIGS. 2A is one example of a process for fabricating the randomized interconnection layer 104 shown in FIG. 1. On top of a substrate 202, a dielectric layer 204 (e.g. silicon dioxide) is deposited. The dielectric layer 204 may cover other electronic circuitry which is not shown. Electrodes, not shown, are discussed in later paragraphs and are embedded within or under the dielectric layer 204 as part of the sensing circuit 106.

A heterogeneous conductive layer 206 is deposited upon the dielectric layer 204. The heterogeneous conductive layer 206 with structural disorder is formed, in one example, by depositing a mixture of at least two materials to a substrate. Material is herein defined to include one or more elements in the Periodic Table of Elements, and molecules of varying complexity. Thus the heterogeneous conductive layer 206 mixture can include metals, metal alloy materials, resistive materials, and semiconductor materials.

The formed heterogeneous conductive layer 206 includes clusters of a first material, clusters of a second material, clusters of a mixture of the first and second materials, and voids. The clusters can be formed through bonds of varying atomic strength. When the heterogeneous conductive layer 206 is exposed to an etchant these various clusters etch at different rates thereby creating the randomized interconnection layer 104. In one example, the randomized interconnection layer 104 includes randomized conductive pattern 208.

In the one example, the substrate 202 is silicon and a set of chalcogenide elements such as Ge, Sb and Te, having an atomic composition ratio of 2:2:5, are co-sputtered on the dielectric layer 204 using Physical Vapor Deposition (PVD) techniques, forming a 20 nm thick heterogeneous conductive layer 206. After a thermal treatment, mutual interaction of the sputtered elements on the wafer surface creates conductive crystals of varying orientations and composition, resulting in structural disorder within the heterogeneous conductive layer 206. Phase diagrams describe the possible conductive alloys that will be formed depending on temperature and ratio between the sputtered elements (e.g. sputtered metals). Other elements and materials can be used such as: Aluminum Alloys, Al-Zinc; Al-Titanium; Al-Silicon; or ternary systems of Al-Titanium-Silicon. The thickness of the heterogeneous conductive layer 206 can vary, being in a range of 10's of nanometers in one example. In another example embodiment, a target in a sputter system can already be made of the Ge—Sb—Te material with the 2:2:5 ratio. Using this target will result in the 2:2:5 ratio being sputtered on the substrate. Co-sputtering (with two or three targets simultaneously) can have the advantage to tune the final composition of the materials on the substrate by tuning the sputter powers for each target.

In another example, the heterogeneous conductive layer 206 is created with a single material. A heterogeneous conductive layer 206 formed from a single material does not have as much structural disorder as heterogeneous conductive layers 206 composed of more than one material. A heterogeneous conductive layer 206 formed from one material etches more uniformly when exposed to an etchant but can still be used.

Temperature treatment of the heterogeneous conductive layer 206 creates additional structural variations in the conductive layer 206. The results of the temperature treatment depend upon variables such as time and temperature. In one example embodiment, the temperature treatment is annealing. Annealing enhances grain, crystal and/or cluster formation in certain materials. These grains can differ in composition depending on the ratio between the deposition rate of the materials. The higher the energy, the higher the uniformity of the formed crystals. Other temperature processes applied to the materials enhance molecular structure formation and variations.

After deposition and thermal treatment of the heterogeneous conductive layer 206, the layer 206 is exposed to a chemical solution which selectively etches the materials in the layer 206, thereby creating the randomized conductive pattern 208 within the randomized interconnection layer 104. The different materials within the layer 206 etch at a different rate. In one example, a thermal treatment is performed in order to form bigger grains and crystals. Another way to form crystals is to deposit the elements at elevated temperatures using a PVD process.

In one example embodiment the heterogeneous conductive layer 206 is formed from a metal alloy on a silicon wafer. The wafer with the deposited metal alloy layer is immersed in a wet etching solution, where anisotropic etching of the metal alloy layer takes place. Isotropic reactive ion etching is used in an alternative example.

The wet etching selectively etches one set of alloy grains in the layer 206 more slowly than non-alloyed, pure metals in the layer 206. In other example embodiments using different materials, other etch rates are possible.

After a predefined amount of time, dependent upon the anisotropic etching rates and the thickness of the heterogeneous conductive layer 206, the heterogeneous conductive layer 206 is transformed into a discontinuous conductive layer with conductive features of random shapes and sizes, herein called the randomized interconnection layer 104. For the Ge, Sb and Te alloy layer 206, discussed earlier, the layer 206 is etched with a buffered HF solution (BOE) for 90 seconds.

The structural disorder within the heterogeneous conductive layer 206 customizes the randomized interconnection layer 104. This customization creates a fingerprint within the electronic device 102 which can be used as a PUF, a random number generator, or for some other purpose.

Figure 2B:
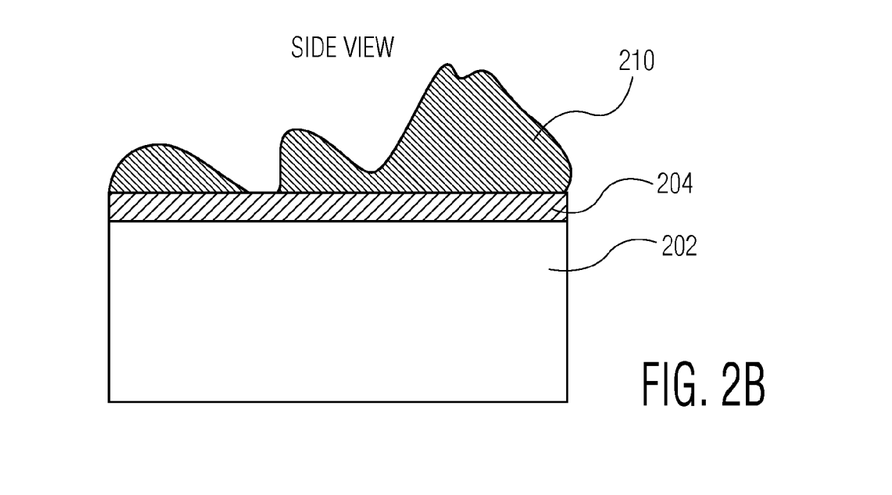
FIG. 2B is another example of the fabricated randomized interconnection layer.

The random pattern in the randomized interconnection layer 104 is formed in response to a selectivity of the etch chemistry towards different crystal orientations and locally different crystal compositions in the heterogeneous conductive layer 206. FIG. 2A shows an idealized heterogeneous conductive layer 206 that has been selectively etched to produce the randomized conductive pattern 208. FIG. 2B is another randomized conductive pattern 210 within the randomized interconnection layer 104, showing a magnified variation in height of the randomized interconnection layer 104 after selective etching.

Figure 3A:
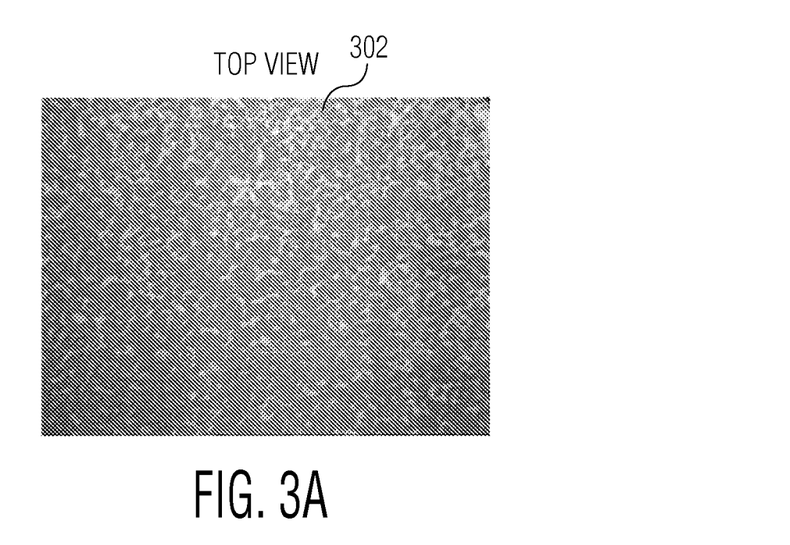
FIGS. 3A and 3B show one example of a top view and a top magnified view of the fabricated randomized interconnection layer.
Figure 3B:
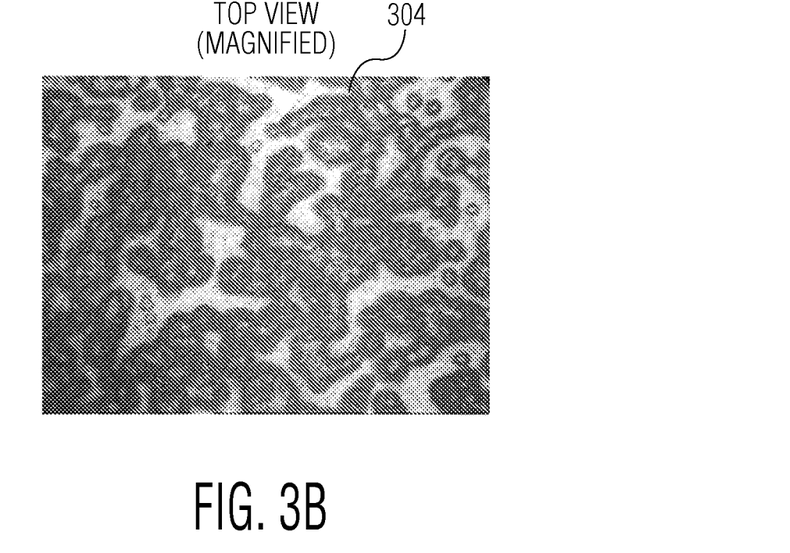

FIGS. 3A and 3B show one example of a top view 302 and a top magnified view 304 of a randomized conductive pattern in an actual fabricated randomized interconnection layer 104. Metals from the chalcogenide group of elements formed the heterogeneous conductive layer 206, shown in FIGS. 3A and 3B after etching. A microscope was used to capture these views which show random metal features forming the randomized interconnection layer 104.

Figure 4:
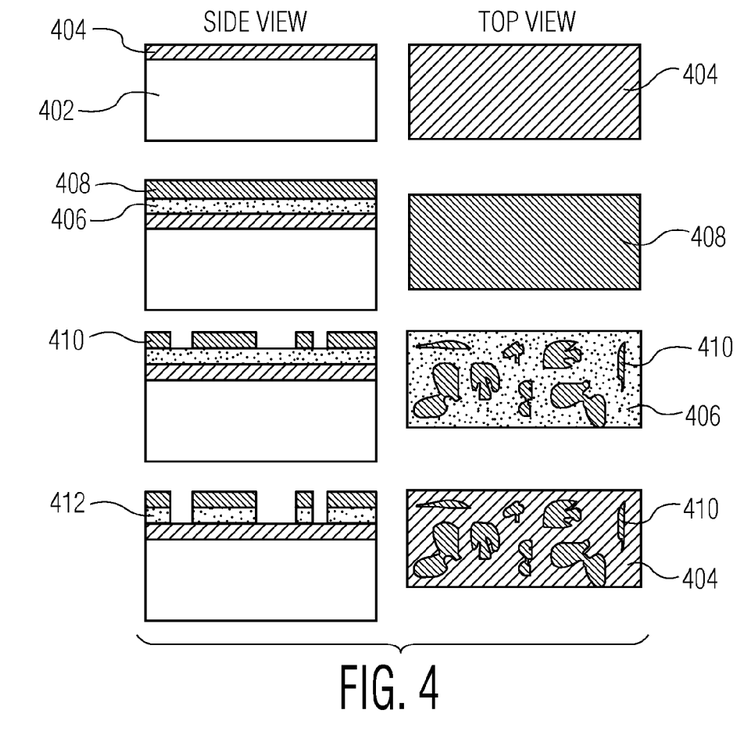
FIG. 4 is yet another example of a process for fabricating the randomized interconnection layer.

FIG. 4 is yet another example of a process for fabricating the randomized interconnection layer 104. A dielectric layer 404, a conductive layer 406, and a heterogeneous non-conductive layer 408 on formed on top of a substrate 402 in that order. The conductive layer 406 in one example is a single metal element. The heterogeneous non-conductive layer 408 includes a mixture of elements that when combined are susceptible to crystal dependent etching as discussed with respect to FIG. 2. In one example, the heterogeneous non-conductive layer 408 includes crystals formed in a binary or ternary (quarternary, . . . etc.) material system, like GeSbTe.

A randomized non-conductive pattern 410 is formed from the heterogeneous non-conductive layer 408 by a first anisotropic etching, thereby generating randomized features and structures on top of the conductive layer 406 as shown in FIG. 4. The first etching of the hard-masking layer is selective enough so that the conductive layer 406 is not excessively under etched.

The randomized non-conductive pattern 410 then serves as a hard-masking layer for a second etching which transfers the randomized non-conductive pattern 410 to the conductive layer 406 thereby forming an etched conductive layer 412. While in one example a random pattern with metal mixtures is created as described, in another example this random pattern is used as a mask to transfer to another layer, this second layer can be a dielectric layer of different dielectric constant than that of surrounding material. The random pattern of dielectric material can be measured by using capacitive sensors.

One example advantage of this approach is that after full processing of an integrated circuit (IC), thermal treatment of the IC has less influence on the etched conductive layer 412 which is now protected by the hard-mask randomized non-conductive pattern 410. The randomized non-conductive pattern 410 however may degrade with additional IC thermal treatment, but performance of the electronic device 102 will not be degraded, or as much.

Figure 5:
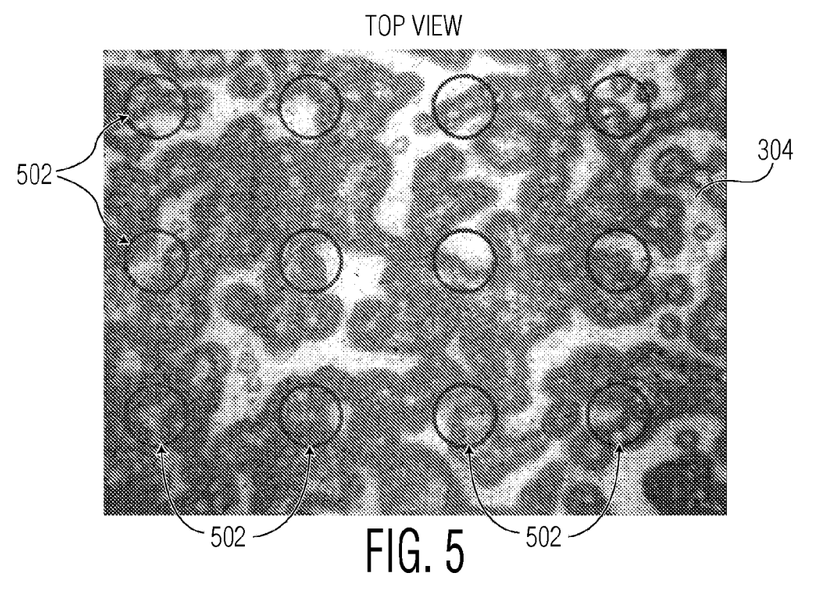
FIG. 5 is one example of a first electrode interface between the randomized interconnection layer and a sensing circuit.

FIG. 5 is one example of a first electrode 502 interface between the randomized interconnection layer 104 and the sensing circuit 106. The example top magnified view 304 of the randomized interconnection layer 104 from FIG. 3 is shown. Twelve electrodes 502 are shown as circles superimposed on the example 304 layer 104. The electrodes 502 connect the randomized interconnection layer 104 to the sensing circuit 106 using one or more electro-magnetic techniques, including: an impedance connection (resistive, capacitive, inductive); a semiconductor connection; or any other electro-magnetic connection. The sensing circuit 106 senses the randomized interconnection layer's 104 pattern and translates that pattern into a value sent to the output device 108. The pattern detected by the sensing circuit 106 depends upon the presence, size and orientation of the randomized interconnection layer's 104 features directly above the electrodes 502. The number of electrodes 502 used by the sensing circuit 106 depends can vary from one electronic device 102 to another.

Figure 6A:
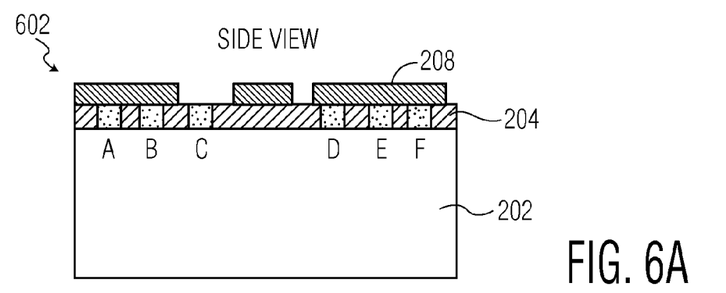
FIG. 6A is one example of a second electrode interface between the randomized interconnection layer and the sensing circuit.

FIG. 6A is one example of a second electrode interface 602 between of the randomized interconnection layer 104, including the randomized conductive pattern 208, and the sensing circuit 106. The electrodes are formed within the dielectric layer 204. The second electrode interface 602 is formed as a resistive connection between electrodes A and B, and electrodes D, E and F and the randomized conductive pattern 208. Electrode C in FIG. 6A is not connected to the randomized conductive pattern 208. The sensing circuit 106 (not shown) is connected to a set of the electrodes and measures a resistance between pairs of selected electrodes. The sensing circuit 106 need not be connected to, nor measure between, all of the electrodes.

An example sensing circuit 106 designed to measure the resistance between electrodes A and B in FIG. 6A, will measure a finite/low resistance value since the randomized conductive pattern 208 connects electrode A to electrode B. An example sensing circuit 106 designed to measure the resistance between electrodes A and C in FIG. 6A, will measure an infinite/high resistance value since the randomized conductive pattern 208 does not connect electrode C to any of the other electrodes. The sensing circuit 106 then translates this resistive disorder in the randomized conductive pattern 208 into a unique signal, number, code, or other information format required by the output device 108.

Figure 6B:
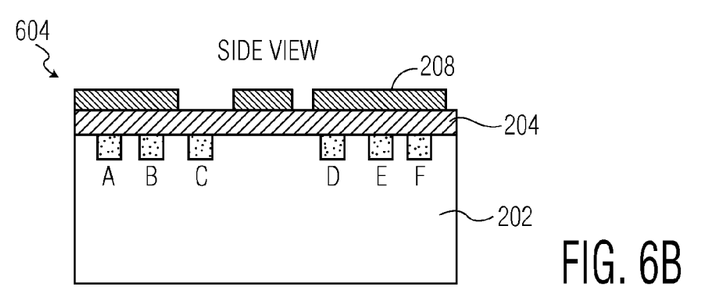
FIG. 6B is one example of a third electrode interface between the randomized interconnection layer and the sensing circuit.

FIG. 6B is one example of a third electrode interface 604 between the randomized conductive pattern 208 and the sensing circuit 106. The electrodes are formed within the substrate layer 202. The third electrode interface 604 is formed as a capacitive connection between electrodes A, B, C, D, E and F and the randomized conductive pattern 208. The sensing circuit 106 (not shown) is connected to a set of the electrodes and measures a capacitance between pairs of selected electrodes. The sensing circuit 106 need not be connected to, nor measure between, all of the electrodes.

An example sensing circuit 106 designed to measure the capacitance between electrodes A and B in FIG. 6B, will measure a lower capacitance value than a sensing circuit 106 designed to measure the capacitance between electrodes A and C since the randomized conductive pattern 208 is in closer proximity to electrodes A and B, but is further away from electrode C. The sensing circuit 106 then translates this capacitive disorder in the randomized conductive pattern 208 into a unique signal, number, code, or other information format required by the output device 108.

Figure 6C:
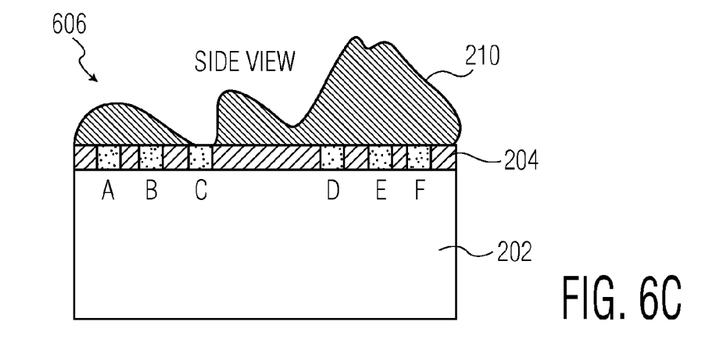
FIG. 6C is one example of a fourth electrode interface between the randomized interconnection layer and the sensing circuit.

FIG. 6C is one example of a fourth electrode interface 606 between the randomized conductive pattern 210 within the randomized interconnection layer 104, and the sensing circuit 106. Similar to FIG. 6A, the electrodes are formed within the dielectric layer 204. The fourth electrode interface 606 is formed as a resistive connection between electrodes A and B, and electrodes D, E and F and the randomized conductive pattern 210. Electrode C in FIG. 6C is not connected to the randomized conductive pattern 210.

An example sensing circuit 106 designed to measure the resistance between electrodes A and B in FIG. 6C, will measure a finite/low resistance value since the randomized conductive pattern 210 connects electrode A to electrode B. An example sensing circuit 106 designed to measure the resistance between electrodes A and C in FIG. 6C, will measure an infinite/high resistance value since the randomized conductive pattern 210 does not connect electrode C to any of the other electrodes.

Figure 6D:
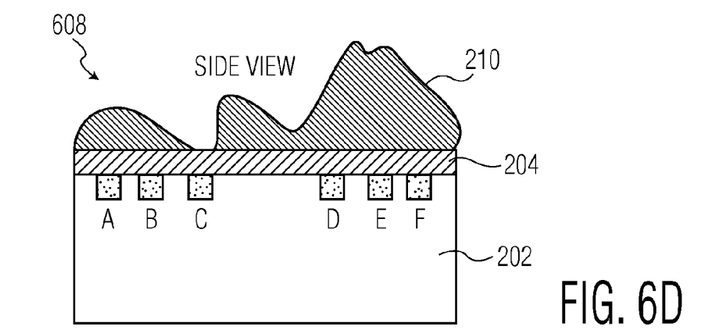
FIG. 6D is one example of a fifth electrode interface between the randomized interconnection layer and the sensing circuit.

FIG. 6D is one example of a fifth electrode interface 608 between the randomized conductive pattern 210, within the randomized interconnection layer 104, and the sensing circuit 106. The electrodes are formed within the substrate layer 202. The third electrode interface 604 is formed as a capacitive connection between electrodes A, B, C, D, E and F and the randomized conductive pattern 210. The sensing circuit 106 (not shown) is connected to a set of the electrodes and measures a capacitance between pairs of selected electrodes.

An example sensing circuit 106 designed to measure the capacitance between electrodes A and B in FIG. 6D, will measure a lower capacitance value than a sensing circuit 106 designed to measure the capacitance between electrodes A and C since the randomized conductive pattern 210 is in closer proximity to electrodes A and B, but is further away from electrode C.

In another example (not shown), a sixth electrode interface between the randomized conductive pattern 210 within the randomized interconnection layer 104, and the sensing circuit 106 is formed. The sixth electrode interface includes some combination of resistive, capacitive, and inductive portions which can be analyzed by the sensing circuit 106 to translate the structural disorder in the interconnection layer 104 into a unique signal, number, code, or other information format.

Figure 7A:
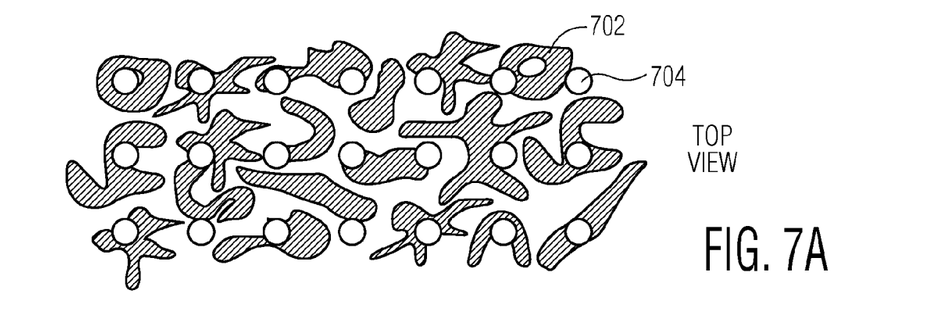
FIG. 7A is one example of a first randomized interconnection layer within a multilayer device.

FIG. 7A is one example of a first randomized interconnection layer 702 within a multilayer device. The first layer 702 is formed according to one or more of the techniques discussed with respect to FIGS. 2 through 6 on either a front or back side of a wafer. The first layer 702 is coupled to a set of electrodes 704 which are also coupled to the sensing circuit 106. If the multilayer device is formed on the back of the wafer, then the set of electrodes 704 are coupled to the sensing circuit 106 using Through Silicon Vias (TSVs).

A TSV is an electrical connection passing completely through a silicon wafer or die. For large TSVs, the feature in the first randomized interconnection layer 702 will also need to be larger. Larger interconnection layer 702 features are easier to detect using optical techniques and other analysis tools. If the features can be easily detected, then electronic devices 102 used for security purposes would be more easily compromised.

Figure 7B:
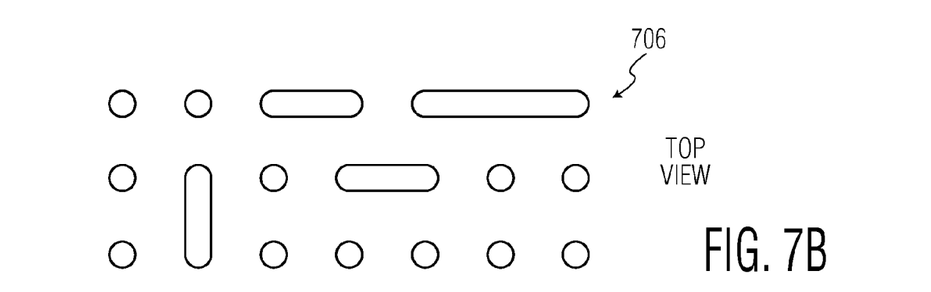
FIG. 7B is one example of electrical interconnections between a set of electrodes within the multilayer device.

FIG. 7B is one example of electrical interconnections 706 between the set of electrodes 704 within the multilayer device. The electrical interconnections 706 in one example are instantiated between the electrodes 702 and the sensing device 106. Variations in the electrical interconnections 706 increase a level of security which the multilayer device can provide.

Figure 7C:
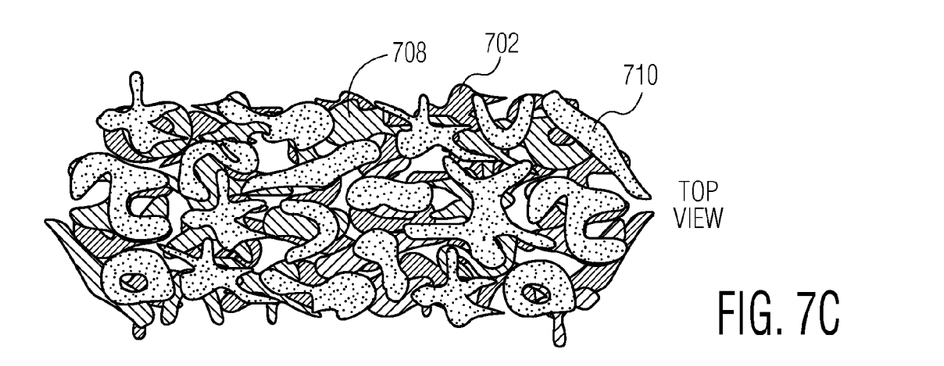
FIG. 7C is one example of a second and a third layer covering the first randomized interconnection layer within the multilayer device.

FIG. 7C is one example of a second 708 and a third 710 layer covering the first randomized interconnection layer 702 within the multilayer device. The second 708 and third 710 layers are in one example formed according to one or more of the techniques discussed with respect to FIGS. 2 through 6 and may either be conductive or non-conductive. In an example embodiment, the second 708 and third 710 layers are electrically isolated from the first layer 702. In another example, the second 708 and third 710 layers are separated from the first layer 702 and each other by a dielectric separation layer. This dielectric separation layer in one example is 10-100 nm thick and prevents a sufficient depth resolution to identify which features belong to which layer during any reverse engineering attempts. The separation layer in one example has a different etching rate in the etchant as compared to that of the metal layers.

Addition of the second 708 and third 710 layers increases the difficulty of detecting the features in the first layer 702 of the multilayer device since the features in the second 708 and third 710 layers are likely to be confusingly similar to the features in the first randomized interconnection layer 702.

Figure 7D:
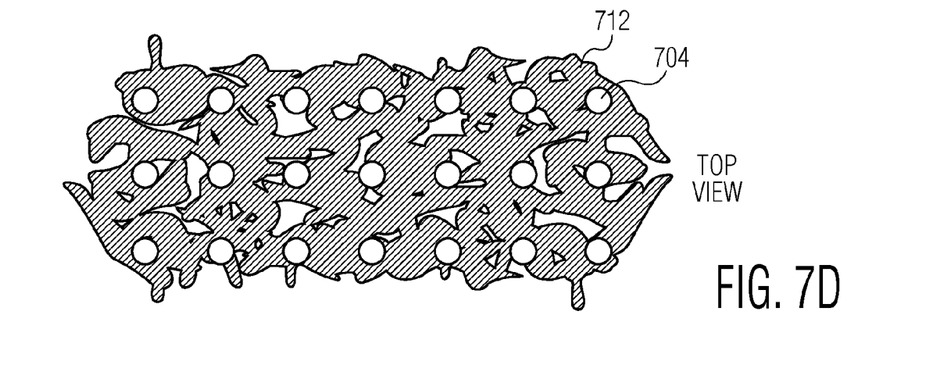
FIG. 7D is one example of the multilayer device viewed using an analysis tool.

FIG. 7D is one example of the multilayer device viewed using an analysis tool. To an analysis tool, such as an optical analysis tool, the first, second and third layers 702, 708 and 710 blend together in to a composite image 712. The closer the layers 702, 708 and 710 are stacked together the harder it is for an analysis tool to resolve the first layer 702 which forms the actual interconnections between the electrodes 704. Due to the closeness of the multiple layers 702, 708 and 710 a sensing circuit 106 using resistive detection may work better in some applications.

Figure 8:
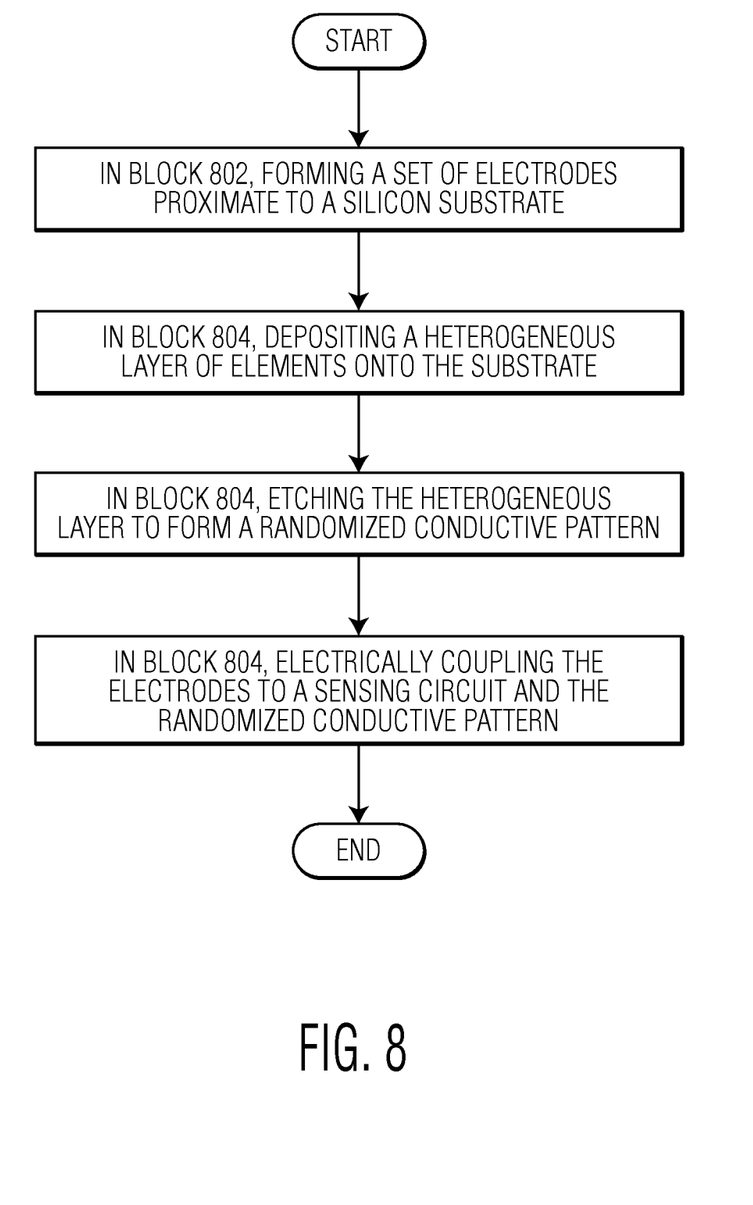
FIG. 8 is one example of a flowchart for fabricating the randomized interconnection layer.

FIG. 8 is one example of a flowchart 800 for fabricating the randomized interconnection layer 104 within the electronic device 102. The method 800 begins in block 802, by forming a set of electrodes 502 proximate to a silicon substrate 202. Next in block 804, a heterogeneous layer 206 or 408 of elements is deposited onto the substrate. In block 806, the heterogeneous layer 206 or 408 is etched to form a randomized conductive pattern 208 or 210. Then in block 808, the electrodes 502 are electrically coupled to a sensing circuit 106 and the randomized conductive pattern 208 or 210.

The blocks comprising the flowcharts in the above Figures can be effected in any order, unless a specific order is explicitly stated. Also, those skilled in the art will recognize that while one example method embodiment is now discussed, the material in this specification can be combined in a variety of ways to yield other examples as well. The method next discussed is to be understood within a context provided by this and other portions of this detailed description.

In this specification, example embodiments have been presented in terms of a selected set of details. However, a person of ordinary skill in the art would understand that many other example embodiments may be practiced which include a different selected set of these details. It is intended that the following claims cover all possible example embodiments.

What is claimed is:

1. An electronic device, comprising:
    a randomized interconnection layer having a randomized conductive pattern formed by etching of a heterogeneous layer; and
    a sensing circuit, electrically coupled to the randomized interconnection layer to detect the randomized conductive pattern.

2. The device of claim 1, wherein the heterogeneous layer includes crystal clusters of varying orientations and the randomized interconnection layer having the randomized conductive pattern is a discontinuous layer with conductive features of random shapes and sizes.

3. The device of claim 1, wherein the heterogeneous layer includes at least a first material and a second material and includes grains differing in composition depending on a ratio between a deposition rate of the first material and a deposition rate of the second material.

4. The device of claim 1, wherein the heterogeneous layer includes at least one from a group consisting of: a conductive material; a metal alloy; a set of chalcogenide elements; a resistive material; a semiconductor material; Ge and Sb and Te; Aluminum alloy; Al and Zinc; Al and Titanium; and Al and Silicon.

5. The device of claim 1, wherein the randomized conductive pattern includes randomly distributed features of different shapes and sizes.

6. The device of claim 1, wherein the randomized conductive pattern includes a structural disorder and the sensing circuit is configured and arranged to translate the structural disorder of the randomized conductive pattern into a value; and
    wherein the randomized conductive pattern is formed by anisotropic etching of different crystal orientations and locally different crystal compositions of materials in the heterogeneous layer.

7. The device of claim 1, wherein the device includes a security device configured and arranged to use the randomized conductive pattern as a security feature; and
    wherein the randomized conductive pattern is one from a group consisting of: a randomly etched resistive layer; and a randomly etched semiconductor layer.

8. The device of claim 1,
    wherein the sensing circuit comprises: a set of electrodes coupled to the randomized interconnection layer; and
    wherein the randomized conductive pattern detected by the sensing circuit depends upon features in the randomized conductive pattern which are directly above the electrodes.

9. The device of claim 1, wherein the sensing circuit comprises: a set of electrodes coupled to the randomized interconnection layer; and wherein the sensing circuit measures a resistance or a capacitance between a sub-set of the electrodes.

10. The device of claim 1, wherein the randomized conductive pattern is a first randomized layer, further comprising:

an additional set of randomized layers formed by etching of an additional set of heterogeneous layers and covering portions of the first randomized layer and the additional set of randomized layers: and an electrical isolation material between the first randomized layer and the additional set of randomized layers.

11. The device of claim 1, wherein the randomized conductive pattern is included in a Physically Unclonable Function (PUF).

12. A system, comprising:

a randomized interconnection layer having a randomized conductive pattern formed by etching of a heterogeneous layer;

a sensing circuit, electrically coupled to the randomized interconnection layer to translate the randomized conductive pattern into a value; and an output device, coupled to the sensing circuit, translating the value into at least one from a group consisting of: a random number; a security key; and a Physically Unclonable Function.

13. A method of fabricating an electronic device, comprising:

forming a set of electrodes proximate to a silicon substrate;

depositing a heterogeneous layer of elements onto the substrate;

etching the heterogeneous layer to form a randomized conductive pattern; and electrically coupling the electrodes to a sensing circuit and the randomized conductive pattern.

14. The method of claim 13, wherein the randomized conductive pattern is formed by at least one of:

a difference between a first etching rate of a first element and a second etching rate of a second element in the heterogeneous layer; and in response to a selectivity of an etch chemistry towards different crystal orientations and locally different crystal compositions in the heterogeneous layer.

15. The method of claim 13, further comprising, annealing the heterogeneous layer before etching, wherein either grain, crystal or cluster formation in the heterogeneous layer is enhanced.

16. The method of claim 13, wherein the randomized conductive pattern is a first randomized layer, further comprising:

depositing an additional set of randomized layers formed by etching of an additional set of heterogeneous layers on top of the first randomized layer; and electrically isolating the first randomized layer from the additional set of randomized layers.

17. An electronic device, comprising:

a randomized interconnection layer having a randomized conductive pattern formed by etching of a heterogeneous layer; and a sensing circuit, electrically coupled to the randomized interconnection layer to detect the randomized conductive pattern, wherein the randomized conductive pattern is included in a Physically Unclonable Function (PUF).

18. The device of claim 17, wherein the heterogeneous layer includes a mixture of at least two materials, each of the at least two materials configured to etch at different rates when forming the randomized conductive pattern by etching.

19. The device of claim 17, wherein the randomized conductive pattern includes a structural disorder and the sensing circuit is configured and arranged to translate the structural disorder of the randomized conductive pattern into a value.

20. The device of claim 17, wherein the sensing circuit comprises: a set of electrodes coupled to the randomized interconnection layer; and wherein the randomized conductive pattern detected by the sensing circuit depends upon at least one of:

features in the randomized conductive pattern which are directly above the electrodes; and a resistance or a capacitance between a sub-set of the electrodes.

* * * * *